United States Patent
Lafon et al.

(10) Patent No.: US 10,847,145 B2
(45) Date of Patent: Nov. 24, 2020

(54) VOICE RECOGNITION SYSTEM AND METHOD FOR AIRCRAFT

(71) Applicant: THALES, Courbevoie (FR)

(72) Inventors: Stéphanie Lafon, Merignac (FR); Alexiane Bailly, Merignac (FR); Geoffroy Beaumier, Merignac (FR)

(73) Assignee: THALES, Courbevoie (FR)

( * ) Notice: Subject to any disclaimer, the term of this patent is extended or adjusted under 35 U.S.C. 154(b) by 83 days.

(21) Appl. No.: 16/388,600

(22) Filed: Apr. 18, 2019

(65) Prior Publication Data

US 2020/0027449 A1   Jan. 23, 2020

(30) Foreign Application Priority Data

May 4, 2018   (FR) .................................... 18 00427

(51) Int. Cl.
   *G08G 5/00*   (2006.01)
   *G10L 15/22*   (2006.01)
   (Continued)

(52) U.S. Cl.
   CPC ............ *G10L 15/19* (2013.01); *G08G 5/0047* (2013.01); *G10L 15/00* (2013.01); *G10L 15/063* (2013.01);
   (Continued)

(58) Field of Classification Search
   CPC .. G08G 5/0013; G08G 5/0021; G08G 5/0034; G08G 5/0091; G08G 5/0082;
   (Continued)

(56) References Cited

U.S. PATENT DOCUMENTS 7,809,405 B1 * 10/2010 Rand .................... G08G 5/0013
                                                      455/563
8,090,402 B1 *  1/2012 Fujisaki ............. H04N 1/00127
                                                      455/556.1
(Continued)

FOREIGN PATENT DOCUMENTS

EP   0 618 565 A2   10/1994
FR   3 049 753 A1   10/2017

OTHER PUBLICATIONS

Pearson, G., "Voice Recognition & Synthesis for Air Traffic Control Simulation", Voice Recognition & Synthesis for Air Traffic Control Simulation, pp. 1-4, Jan. 1, 2003. URL:http//www/simulationaustralasia.com/files/upload/pdf/research/009-2003.pdf (accessed Jan. 15, 2019).

(Continued)

*Primary Examiner* — Linda Wong
(74) *Attorney, Agent, or Firm* — Arent Fox LLP

(57) ABSTRACT

The invention relates to a voice recognition implemented in a carrier aircraft cockpit, for recognizing aircraft indicators used in operational audio messages received in or sent by the carrier aircraft. The system includes a computing device suitable implementing modules for:
   providing the aircraft indicator of the carrier aircraft,
   determining adjacent aircraft indicators located in a current air traffic control zone,
   updating and storing a voice recognition grammar of aircraft indicators from the carrier aircraft indicator and at least some of the adjacent aircraft indicators,
   voice recognition engine for audio messages received or sent using the stored aircraft indicator voice recognition grammar.

11 Claims, 2 Drawing Sheets

(51) Int. Cl.
*G10L 15/00* (2013.01)
*G10L 15/19* (2013.01)
*G10L 15/06* (2013.01)

(52) U.S. Cl.
CPC ...... *G10L 15/22* (2013.01); *G10L 2015/0635* (2013.01); *G10L 2015/223* (2013.01)

(58) Field of Classification Search
CPC .... G08G 5/025; G08G 5/0008; G08G 5/0043; G08G 5/0078; G08G 5/0086; G08G 5/045; G08G 5/065; G08G 1/096827; G08G 5/0047; G10L 15/22; G10L 15/26; G10L 15/01; G10L 2015/221; H04W 4/021
See application file for complete search history.

(56) References Cited

U.S. PATENT DOCUMENTS

| | | | | |
|---|---|---|---|---|
| 8,311,578 B1* | 11/2012 | Fujisaki | ............ | H04N 1/00127 455/556.1 |
| 8,532,844 B2* | 9/2013 | Wilson | ................ | G08G 5/0021 701/3 |
| 8,704,701 B2* | 4/2014 | Pschierer | ............ | G01S 13/933 342/36 |
| 9,666,178 B2* | 5/2017 | Loubiere | ................ | G10L 13/00 |
| 2004/0128039 A1* | 7/2004 | Podowski | .......... | H04B 7/18506 701/33.4 |
| 2006/0046715 A1* | 3/2006 | Burgemeister | ....... | G08G 5/0013 455/431 |
| 2008/0201148 A1 | 8/2008 | Desrochers | | |
| 2011/0066362 A1* | 3/2011 | He | ...................... | G08G 5/0078 701/120 |
| 2011/0257813 A1* | 10/2011 | Coulmeau | ........... | G08G 5/0013 701/2 |
| 2012/0010887 A1* | 1/2012 | Boregowda | ............ | G10L 15/22 704/250 |
| 2015/0170525 A1* | 6/2015 | Conner | ................ | G08G 5/0021 701/3 |
| 2015/0338853 A1* | 11/2015 | Casado Magana | .. | G08G 5/0026 701/5 |
| 2016/0063999 A1 | 3/2016 | Gaston et al. | | |
| 2016/0139876 A1* | 5/2016 | Alves | ................... | G08G 5/0047 715/728 |
| 2016/0196754 A1* | 7/2016 | Surace | ................ | G08G 5/0013 701/117 |
| 2016/0260264 A1* | 9/2016 | Shih | ..................... | G08G 5/0021 |
| 2016/0284220 A1* | 9/2016 | Kar | ..................... | G08G 5/0078 |
| 2017/0115399 A1* | 4/2017 | Cote | ................... | H04L 67/1097 |
| 2017/0287467 A1 | 10/2017 | Lafon et al. | | |
| 2018/0044034 A1* | 2/2018 | Newman | ............... | H04B 7/1851 |
| 2018/0166074 A1* | 6/2018 | Aggarwal | ............... | G10L 15/02 |
| 2018/0174588 A1* | 6/2018 | Agarwal | ................ | G10L 15/01 |
| 2019/0087576 A1* | 3/2019 | Olson | ....................... | G06F 7/00 |
| 2019/0088147 A1* | 3/2019 | Kusuma | .............. | G08G 5/0013 |
| 2019/0147858 A1* | 5/2019 | Letsu-Dake | ........... | G06F 40/00 704/275 |
| 2019/0279124 A1* | 9/2019 | Beynel | ................ | G06Q 10/025 |
| 2019/0289512 A1* | 9/2019 | Kaneda | ................ | G05D 1/0022 |
| 2019/0318741 A1* | 10/2019 | Songa | ..................... | G06F 3/167 |
| 2019/0333298 A1* | 10/2019 | Couturier | ............... | G07C 5/085 |

OTHER PUBLICATIONS

Preliminary Search Report of related French Application No. FR 18 00427, dated Jan. 22, 2019.

* cited by examiner

VOICE RECOGNITION SYSTEM AND METHOD FOR AIRCRAFT

CROSS-REFERENCE TO RELATED APPLICATIONS

This application claims priority to French Patent Application No. 18 00427, filed on May 4, 2018. The disclosure of the prior application is hereby expressly incorporated by reference in its entirety.

FIELD OF THE INVENTION

The present invention relates to a voice recognition system and method implemented in a carrier aircraft cockpit, for recognizing aircraft indicators used in operational audio messages.

The present invention belongs to the field of multimodal man-machine interfaces (MMI) for aircraft cockpits.

BACKGROUND OF THE INVENTION

Indeed, in a cockpit, the pilot(s) in particular need man-machine interfaces to communicate with outside persons, to exchange operational messages relative to the piloting. It for example involves communications coming from air traffic control (ATC), the navigating personnel, the indication of the frequency dedicated to the airline, etc.

The known multimodal cockpit man-machine interfaces simultaneously include one or several viewing screens, which are optionally touch-sensitive and serve as control interface, physical interactors (buttons/keyboards), rotary controls, audio interfaces (speakers or headsets, for example). Thus, for example, the pilots can receive instructions through various channels, for example by radio.

It was proposed in patent application FR 3,049,753 A1 to use a voice recognition engine to segregate operational audio messages based on keywords recognized in said audio messages. This segregation makes it possible to divide the received audio stream into messages intended for or sent by a given aircraft, and next to associate a priority with these messages and process them based on their priority, which makes it possible to provide services making it possible to assist with piloting, for example: recording messages by priority, increasing the sound level for high-priority messages.

One of the issues in this context is the performance of a voice recognition engine.

Furthermore, the segregation of the proposed audio messages implements the recognition of aircraft indicators, also known as call signs, since it is generally provided, in the phraseology of operational messages, to use the aircraft call sign as identifier making it possible to recognize the sender or the recipient of a message.

However, pilots and controllers do not scrupulously respect the operational phraseology.

In a known manner, an aircraft indicator, generally known as call sign, is an identifier made up of letters and numbers, making it possible to recognize an aircraft uniquely, including a trigram indicating the operator of the aircraft or an aeronautic administration, a number with 1 to 4 digits, and sometimes, additionally, one to two additional letters.

However, not all aircraft call signs have the same number of characters, and pilots or air traffic controllers do not all state the aircraft call sign in the same way. For example, the number "1234" can be read "one two three four" or "one thousand two hundred thirty-four" or "twelve thirty-four".

Furthermore, sometimes they do not state the entire aircraft call sign, omitting part of the beginning or end of the call sign.

When the audio message is interpreted by a human being, such variations or omissions are not problematic, but for a voice recognition engine, the recognition performance may be quickly diminished.

The invention aims to resolve the aforementioned drawbacks, by proposing a recognition system having improved performance for the recognition of aircraft indicators stated in operational audio messages exchanged in the context of piloting.

SUMMARY OF THE INVENTION

To that end, according to a first aspect, the invention proposes a voice recognition system implemented in a carrier aircraft cockpit, for recognizing aircraft indicators used in operational audio messages received in or sent by the carrier aircraft. The system includes a computing device suitable for implementing modules for:
  providing the aircraft indicator of the carrier aircraft,
  determining adjacent aircraft indicators located in a current air traffic control zone,
  updating and storing a voice recognition grammar of aircraft indicators from the carrier aircraft indicator and at least some of the adjacent aircraft indicators,
  voice recognition engine for audio messages received or sent using the stored aircraft indicator voice recognition grammar.

Advantageously, the voice recognition system of the invention implements a dynamic update of a dedicated grammar for the aircraft indicators, to improve the performance of the voice recognition engine.

The voice recognition system according to the invention may have one or more of the features below, considered independently or in combination.

The system further includes a module for accessing the data from an airspace monitoring system suitable for providing the determining module with indicators of aircrafts located in a same geographical zone as the carrier aircraft and a geo-located position of each of said aircrafts.

The system further includes a communication management module suitable for providing the determining module with a current radio communication frequency used by the carrier aircraft.

The module for determining adjacent aircraft indicators implements a filter, using a geo-located position of the carrier and a location of the air traffic control zones to obtain the adjacent aircraft indicators located in the same air traffic control zone as the carrier aircraft and using the current radio communication frequency to send and/or receive audio messages.

The system further includes a module for updating a recognition grammar able to produce, for each aircraft indicator of the determined set of aircraft indicators, a set of matching rules relative to a plurality of ways of pronouncing said aircraft indicator.

According to a second aspect, the invention relates to a voice recognition method implemented in a carrier aircraft cockpit, for recognizing aircraft indicators used in operational audio messages received in or sent by the carrier aircraft. This method includes the steps, implemented by a computing device, of:
  obtaining the aircraft indicator of the carrier aircraft,
  determining adjacent aircraft indicators located in a current air traffic control zone, updating and storing a voice recognition grammar of aircraft indicators from the carrier aircraft indicator and at least some of the adjacent aircraft indicators, voice recognition for audio messages received or sent using the stored aircraft indicator voice recognition grammar.

The voice recognition method according to the invention may have one or more of the features below, considered independently or in combination.

The determination of adjacent aircraft indicators implements a filter for obtaining the adjacent aircraft indicators located in the same air traffic control zone as the carrier aircraft and using a same current radio communication frequency to send and/or receive audio messages.

The method further includes a step for updating rules making it possible to obtain, for each aircraft indicator of the determined set of aircraft indicators, a set of matching rules relative to a plurality of ways of pronouncing the aircraft indicator, and storing of the matching rules in a matching table, the matching table being used in the update of the aircraft indicator voice recognition grammar.

The steps for determining adjacent aircraft indicators and updating the aircraft indicator voice recognition grammar are repeated at regular time intervals so as to obtain a dynamic update of the aircraft indicator voice recognition grammar.

The aircraft indicator voice recognition grammar is made up of sub-grammars, each sub-grammar being associated with an aircraft indicator, the update including a sub-grammar deletion associated with an aircraft taken out of the current air traffic control zone and/or an addition of a sub-grammar to an aircraft having entered the current air traffic control zone.

The method further includes a step for determining a next air traffic control zone for the carrier aircraft, and an early preparation step for a second aircraft indicator voice recognition grammar associated with the next air traffic control zone, made up of sub-grammars associated with aircraft indicators present or likely to enter the next air traffic control zone, and loading of the second voice recognition grammar after the carrier aircraft enters said next air traffic control zone for use in the voice recognition.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
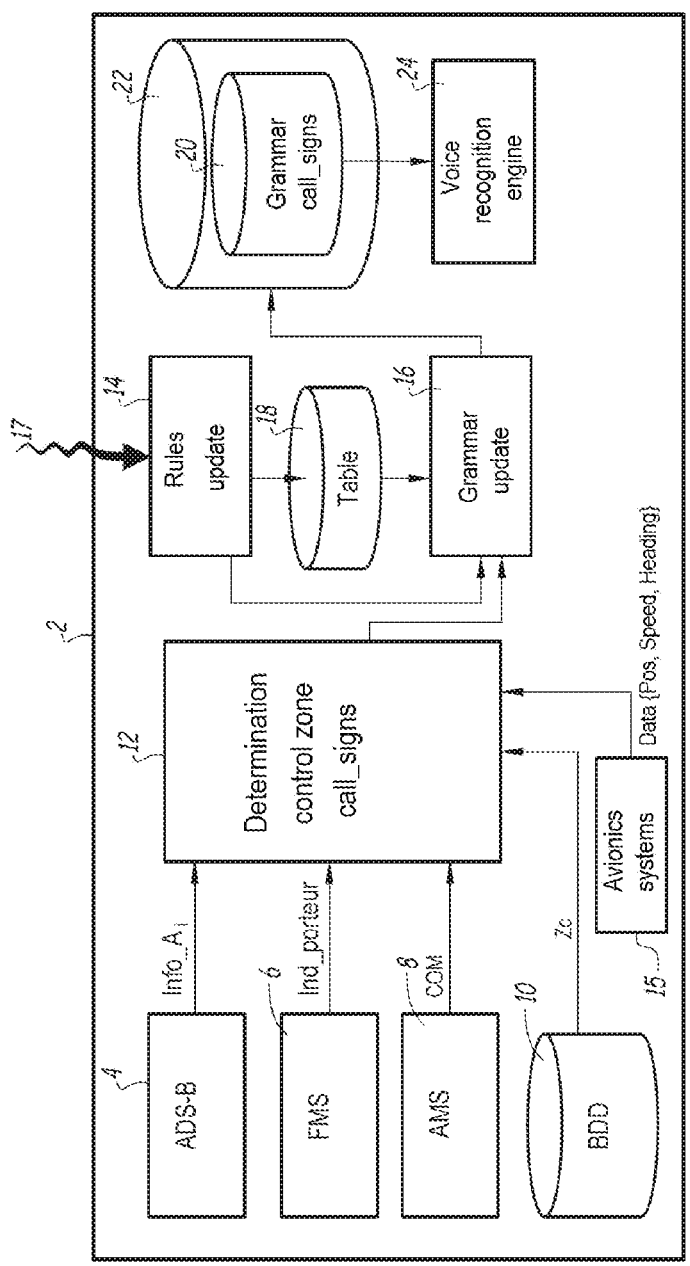
FIG. 1 is a schematic illustration of a voice recognition system according to one embodiment of the invention.

FIG. 1 schematically shows a voice recognition system 2 according to one embodiment.

Such a system is for example installed in the cockpit of an aircraft (not shown), which is called carrier aircraft of the recognition system.

This recognition system 2 includes a module 4 for accessing data from an airspace monitoring system called ADS-B (Automatic Dependent Surveillance Broadcast) that recovers and sends surveillance data. In particular, the module 4 makes it possible to recover data relative to the surrounding aircraft that are communicating on the same radio communication channel as the carrier aircraft, and that are within range of the reception module. Here, these data are denoted $\{Infos\_A_i\}$ for each aircraft Ai and in particular include an aircraft indicator, also known as call sign, $Ind\_A_i$, and position coordinates or data making it possible to describe the trajectory of this aircraft.

The position coordinates of an aircraft are expressed in a geolocation coordinate system with 3 dimensions, in a known manner. It is understood that all of the spatial localizations are done in a same geolocation coordinate system.

The module 4 provides the data $\{Infos\_A_i\}$ to a module 12 for determining aircraft call signs of the current control zone, described in detail hereinafter.

The recognition system 2 also includes a flight management system 6 (FMS). The FMS 6 in particular provides the aircraft call sign specific to the carrier aircraft, Ind_porteur, call sign that the pilot(s) must use in their operational message communications.

The FMS 6 provides the carrier aircraft call sign in data form to the module 12 for determining aircraft call signs of the current control zone. The FMS also provides, in real-time, the current spatial position of the carrier aircraft.

Alternatively, the current spatial position information of the carrier aircraft is provided, in a known manner, by other avionics systems 15.

The recognition system 2 also includes an audio management system (AMS) module 8 that provides the current radio communication frequency COM listened to in the cockpit.

Lastly, the system also comprises a database 10, in particular comprising information relative to the air traffic control zones, making it possible to locate the air traffic control zones Zc.

Alternatively, the recognition system 2 recovers, through a radio communication, information relative to the air traffic control zones.

The system includes other avionics systems 15 that provide avionics data relative to the carrier aircraft and the surrounding aircraft. These avionics data for example include the position in the geo-located coordinate system, the speed, the acceleration, the heading.

The respective modules 4, 6, 8, 10 and 15 provide data at the input of the module 12 for determining aircraft call signs of the current control zone.

The module 12 applies a filter making it possible to obtain, among the aircraft call signs received from the module 4, the aircraft call signs of all of the adjacent aircraft belonging to the same air traffic control zone as the carrier aircraft.

Here, aircraft adjacent to the carrier aircraft refers to any aircraft traveling in the same air traffic control zone and using a same radio communication channel with the remote controls, in particular with the air traffic control.

Thus, by definition, the carrier aircraft is able to receive the operational audio messages sent and received by all of the adjacent aircraft.

The module 12 provides a set of aircraft call signs containing the call sign of the carrier aircraft and the call signs obtained by the filtering described above.

Of course, the module 12 for determining adjacent aircraft call signs is implemented repetitively at regular time intervals, the carrier aircraft being in motion.

The set of adjacent aircraft call signs, including the call sign specific to the carrier aircraft, is provided to a module 16 for updating the grammar to be used for voice recognition.

Furthermore, the recognition system 2 includes a module 14 for updating rules, suitable for updating the rules at any moment, upon outside command 17, for example if there is a change in standard relative to the aircraft call signs.

For each aircraft call sign, the module 16 updates the voice recognition grammar of the aircraft call signs making it possible to take account of the different ways of pronouncing this aircraft call sign.

Indeed, there are various ways of pronouncing a call sign, and not all operators pronounce call signs in the same way.

An aircraft call sign may comprise a code with two letters (AITA code) or a code with three letters (OACI code). There is a correspondence between AITA code and OACI code that is stored in a matching table 18.

As an example, the call sign of the carrier aircraft is Ind-porteur="AF7225BD".

There are several ways of stating this call sign orally, while using the aeronautic alphabet for the letters, for example "AirFrance 7225 Bravo Delta" or "AirFrance 7 2 2 5 Bravo Delta". A number can be said in its entirety, for example "seven thousand two hundred twenty-five" or digit by digit "seven two two five", or split into subparts: "seventy-two" "twenty-five".

Furthermore, the pilot may choose to say "AirFrance 7 2 2 5" or "AirFrance Bravo Delta", which are subsets of the aircraft call sign that are considered sufficient for identification.

It should also be noted that for other airlines, for historic or commercial reasons, the operators call sign does not correspond to the current name of the airline; for example for Aer Lingus, the operator code is Shamrock.

The rule update module 14 produces a set of matching rules for each aircraft call sign of the set received from the module 12, and these matching rules are stored in the matching table 18. This module 14 can for example provide the module 16 with a set of functions that convert a chain of characters (the call sign) into pieces of grammar in a file according to the BNF (Backus-Naur Form) format.

For each aircraft call sign, a sub-grammar is formed.

The module 16 for updating the grammar updates the aircraft call sign grammar based on aircraft call signs filtered by the determining module 12, based on the matching table 18.

The update of a voice recognition grammar is done by known methods accessible to one skilled in the art.

The grammar 20, formed by a plurality of sub-grammars each associated with an aircraft indicator, the update being provided by the module 16, is stored in a module for storing grammars used for voice recognition 22.

Advantageously, the update grammar 20 is specific to the carrier aircraft and the adjacent aircraft in the same control zone, and takes account of variants in how these aircraft call signs are stated.

This grammar 20 is greatly reduced relative to a comprehensive recognition grammar, and allows considerable improvement to the voice recognition of these call signs in audio messages, while being compact and taking up a small memory space.

This local aircraft call sign recognition grammar is used by a traditional voice recognition engine 24.

The module 12 for determining aircraft call signs of the current control zone, the rule update module 14 and the grammar update module 16 are for example implemented by a same electronic computing device, or are each implemented by an electronic computing device.

In one embodiment, these modules are implemented by software code instructions executable by a processor of the electronic computing device.

Alternatively, the executable code instructions are recorded on a computer-readable medium, for example an optical disc, a magnetic-optical disc, a ROM memory, a RAM memory, a non-volatile memory (EPROM, EEPROM, FLASH, NVRAM), a magnetic or optical card.

In one variant, the modules 12, 14 and 16 are made in the form of a programmable logic component, such as an FPGA (Field Programmable Gate Array), or in the form of a dedicated integrated circuit, such as an ASIC (Application Specific Integrated Circuit). Advantageously, the recognition system 2 implements the various modules repetitively in real-time, so as to update the grammar 20 of the aircraft call signs dynamically.

One embodiment of a voice recognition method implemented in a carrier aircraft cockpit is described hereinafter in reference to FIG. 2.

The method comprises a step 30 for obtaining the aircraft call sign (Ind_porteur) of the carrier aircraft, and a step 32 for obtaining data {Infos_$A_i$} relative to the surrounding aircraft, air traffic control zones Zc, the current communication frequency COM and other avionics data on the position, heading, speed.

The method includes a step 34 for determining adjacent aircraft call signs {Ind_$Av_i$} located in the same air traffic control zone as the carrier aircraft, called current air traffic control zone Zc1, and using a same current radio communication frequency to send and/or receive audio messages. This step implements filtering.

Figure 2:
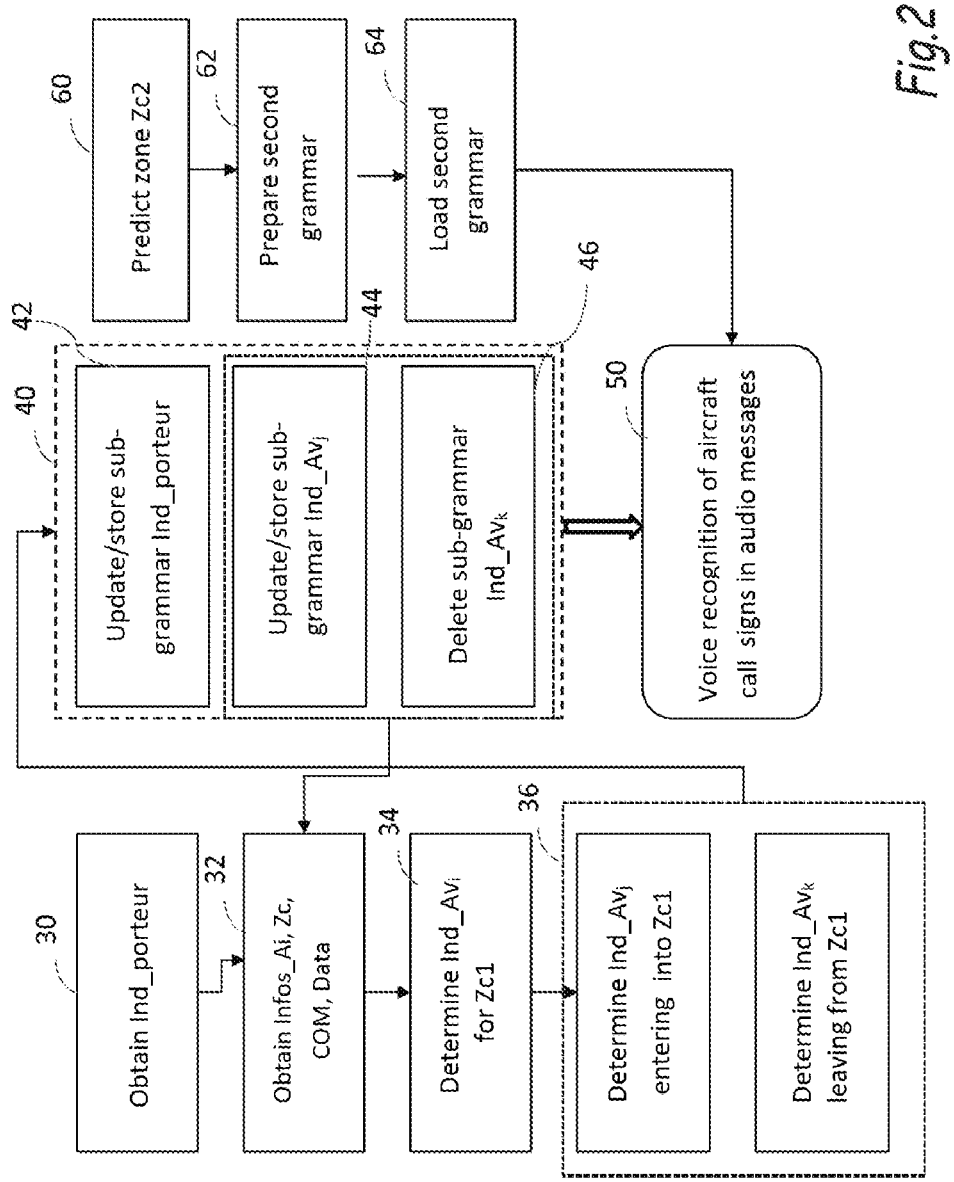
FIG. 2 is a block diagram of one embodiment of the voice recognition method for an aircraft according to the invention.

In the embodiment of FIG. 2, for optimization reasons, the method includes a step 36 for determining call signs of aircraft entering or leaving the current control zone Zc1. This step is carried out upon each iteration except the first. The step 36 comprises a sub-step for determining call signs Ind_$Av_j$ of aircraft entering Zc1 and a sub-step for determining call signs Ind_$Av_k$ of aircraft leaving Zc1.

After step 34 (during the first iteration of the method) or step 36, for the following iterations, a step 40 for updating and storing the voice recognition grammar 20 of the aircraft call signs is carried out.

The step 40 comprises a sub-step 42 for updating and storing the sub-grammar corresponding to the call sign of the carrier aircraft, which is done once during commissioning. Indeed, this sub-grammar will not change based on the air traffic control zones passed through.

Preferably, in order to optimize the updates, the step 40 includes, upon each iteration, a sub-step 44 for updating and adding sub-grammar(s) corresponding to the call sign(s) of aircraft entering the zone Zc1, and/or a sub-step 46 for deleting sub-grammar(s) corresponding to the call signs of aircraft leaving the zone Zc1.

The step 42 is followed by the step 32 previously described, and the steps 32 to 40 are thus iterated at regular time intervals to have a dynamic update.

The grammar update includes, as described above, a step for updating rules making it possible to obtain, for each aircraft indicator of the determined set of aircraft indicators, a set of matching rules relative to a plurality of ways of pronouncing said aircraft call sign, and storing of said matching rules in a matching table, said matching table being used in the update of the aircraft call sign voice recognition grammar.

The updated grammar made up of sub-grammars is provided to a module 50 implementing the voice recognition of aircraft call signs in recorded audio messages.

It should be noted that during a change in control frequency, the carrier aircraft changes air traffic control zone and the update is greater. The sub-grammar of its own aircraft call sign is maintained.

In an optimized embodiment, it is provided to anticipate a change in air traffic control zone and to prepare a grammar in advance corresponding to the next zone.

Indeed, by basing oneself on the avionics data, it is possible to compute the trajectory of the carrier aircraft and, knowing the current air traffic control zone Zc1 and the other air traffic control zones Zc provided by the module 8, it is possible to predict (step 62) the next air traffic control zone Zc2. Furthermore, knowing the speed and the acceleration of the carrier aircraft, it is possible to estimate in how much time the carrier aircraft will enter the next air traffic control zone Zc2.

Thus, at a predetermined temporal distance from a change of air traffic control zone, it is provided, in this embodiment, to prepare, during step 64, a second grammar of the aircraft call signs associated with the air traffic control zone Zc2, by estimating, using the received avionics data, whether certain adjacent aircraft are capable of also entering the air traffic control zone Zc2 or leaving said zone.

As a result, it is possible to prepare recognition sub-grammars in advance for aircraft call signs associated with the aircraft present in or likely to enter the air traffic control zone Zc2.

The steps 62, 64 are carried out in parallel with steps 32 to 40 previously described.

Once the carrier aircraft enters the next air traffic control zone Zc2, which becomes current air traffic control zone, the second grammar is loaded in the memory (step 64) for immediate use. As a result, the speed of voice recognition of the adjacent aircraft call signs is improved.

Thus, the grammar of the aircraft call signs is representative of the carrier aircraft and surrounding aircraft that communicate on a same radio communication channel, and the recognition of these aircraft call signs pronounced in the operational audio messages is made easier.

The recognition system is advantageously implemented in a communication system between the aircraft and the ground.

In such a communication system, ground control systems, for example an ATC system, are suitable for communicating by wireless transmission/reception with an on-board system including a transmission/reception antenna, a module for receiving audio messages and a system for recognizing aircraft call signs as described above.

Owing to the implementation of the proposed recognition system, it is possible to better perform a segregation and prioritization of the operational messages as a function of the aircraft sending or receiving a message.

In an application, following the segregation and prioritization, it is possible to adjust the listening volume so as to provide the pilots in the cockpit with a highest sound level for the highest priority audio messages, for example messages sent to the carrier aircraft and/or aircraft situated in a nearby zone or having a trajectory situated in a nearby zone, a nearby zone being a part of the control zone intersecting the trajectory of the carrier aircraft.

In another application, a segregation of the messages next makes it possible to store the messages, and the pilots then have the possibility of re-listening to messages of a given origin. For example, the adjacent aircraft could be displayed on an electronic map on a viewing screen and the pilot could listen to the conversation between each of these airplanes and the control by interacting directly on said map with the desired aircraft. The discussions of each aircraft would be attached to each aircraft logic entity.

Advantageously, the invention allows a dynamic update, in real-time, of an aircraft call sign grammar dedicated to the carrier aircraft call sign and the adjacent aircraft call signs that are located in the same control zone, which makes it possible to improve the voice recognition of these aircraft call signs in all of the exchanged audio messages.

The invention claimed is:

1. A voice recognition system implemented in a carrier aircraft cockpit, for recognizing aircraft indicators used in operational audio messages received in or sent by the carrier aircraft, the system comprising a computing device configured to implement:
   a module for providing the aircraft indicator of the carrier aircraft,
   a module for determining adjacent aircraft indicators located in a current air traffic control zone,
   a module for updating and storing a voice recognition grammar of aircraft indicators from the carrier aircraft indicator and at least some of the adjacent aircraft indicators,
   a module for voice recognition engine for audio messages received or sent using the stored aircraft indicator voice recognition grammar.

2. The system according to claim 1, further including a module for accessing the data from an airspace monitoring system suitable for providing the module for determining adjacent aircraft indicators with indicators of aircrafts located in a same geographical zone as the carrier aircraft and a geo-located position of each of said aircrafts.

3. The system according to claim 1, further comprising an audio management module for providing the module for determining adjacent aircraft indicators with a current radio communication frequency used by the carrier aircraft.

4. The system according to claim 3, wherein the module for determining adjacent aircraft indicators implements a filter, using a geo-located position of the carrier and a location of the air traffic control zones, to obtain the adjacent aircraft indicators located in the same air traffic control zone as the carrier aircraft and using the current radio communication frequency to send and/or receive audio messages.

5. The system according to claim 1, further including a module for updating a recognition grammar to produce, for each aircraft indicator of the determined set of aircraft indicators, a set of matching rules relative to a plurality of ways of pronouncing the aircraft indicator.

6. A voice recognition method implemented in a carrier aircraft cockpit, for recognizing aircraft indicators used in operational audio messages received in or sent by the carrier aircraft, the method implemented by a computing device, comprising:
   obtaining the aircraft indicator of the carrier aircraft,
   determining adjacent aircraft indicators located in a current air traffic control zone,
   updating and storing a voice recognition grammar of aircraft indicators from the carrier aircraft indicator and at least some of the adjacent aircraft indicators,
   applying voice recognition for audio messages received or sent using the stored aircraft indicator voice recognition grammar.

7. The method according to claim 6, wherein the determination of adjacent aircraft indicators implements a filter for obtaining the adjacent aircraft indicators located in the same air traffic control zone as the carrier aircraft and using a same current radio communication frequency to send and/or receive audio messages.

8. The method according to claim 6, further comprising updating rules to obtain, for each aircraft indicator of the determined set of aircraft indicators, a set of matching rules relative to a plurality of ways of pronouncing the aircraft indicator, and storing of the matching rules in a matching table, the matching table being used in the update of the aircraft indicator voice recognition grammar.

9. The method according to claim 6, wherein the determining adjacent aircraft indicators and updating the aircraft indicator voice recognition grammar are repeated at regular time intervals so as to obtain a dynamic update of the aircraft indicator voice recognition grammar.

10. The method according to claim 9, wherein the aircraft indicator voice recognition grammar is made up of sub-grammars, each sub-grammar being associated with an aircraft indicator, the update including a sub-grammar deletion associated with an aircraft taken out of the current air traffic control zone and/or an addition of a sub-grammar to an aircraft having entered the current air traffic control zone.

11. The method according to claim 9, further including determining a next air traffic control zone for the carrier aircraft, and in anticipation for a second aircraft indicator voice recognition grammar associated with the next air traffic control zone, made up of sub-grammars associated with aircraft indicators present or likely to enter the next air traffic control zone, and loading of the second voice recognition grammar after the carrier aircraft enters said next air traffic control zone for use in the voice recognition.

* * * * *